Dec. 19, 1967 H. C. POLLOCK 3,359,422
ARC DISCHARGE ATOMIC PARTICLE SOURCE FOR
THE PRODUCTION OF NEUTRONS
Filed Oct. 28, 1954
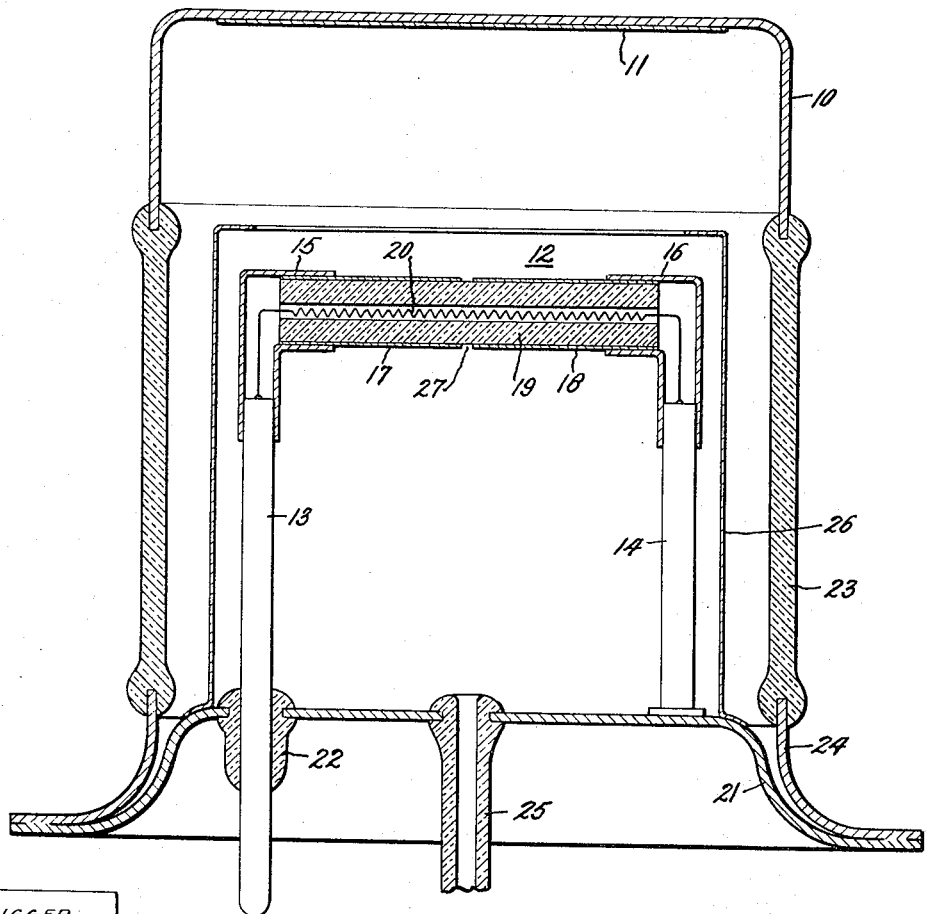
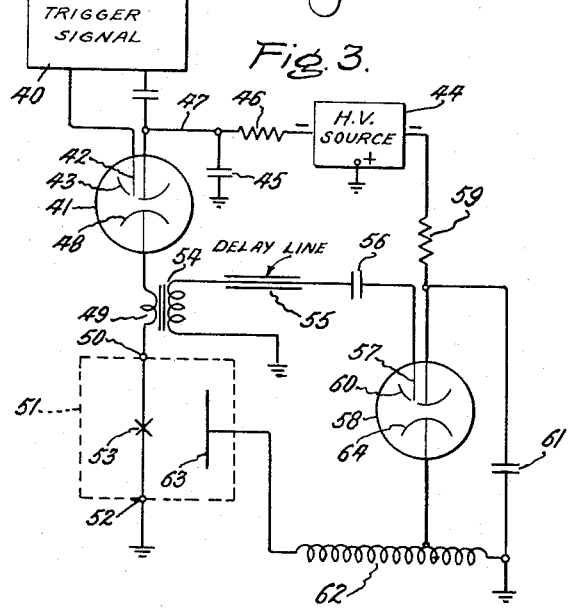
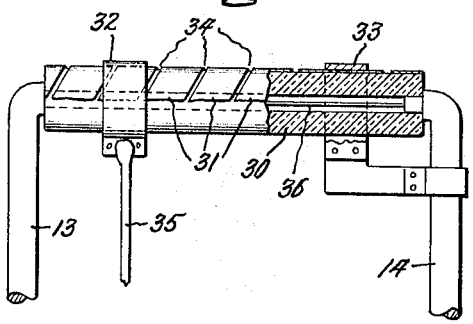
Inventor:
Herbert C. Pollock,
by Paul A. Frank
His Attorney.

United States Patent Office 3,359,422
Patented Dec. 19, 1967

3,359,422
ARC DISCHARGE ATOMIC PARTICLE SOURCE FOR THE PRODUCTION OF NEUTRONS
Herbert C. Pollock, Schenectady, N.Y., assignor to General Electric Company, a corporation of New York
Filed Oct. 28, 1954, Ser. No. 465,333
21 Claims. (Cl. 250—84.5)

This invention relates to a method and apparatus for producing atomic particles. While this invention is subject to a wide range of applications, it is especially suited for use as an ion source for the production of pulses of hydrogen ions which are accelerated to strike an activated target to produce neutrons and will be particularly described in connection with an apparatus for producing timed pulses of neutrons.

Among the principal isotopes of hydrogen are deuterium and tritium. A deuterium nucleus consists of one proton and one neutron while a tritium nucleus consists of one proton and two neutrons. A method of producing neutrons may consist of generating hydrogen isotope ions and accelerating these ions to high energies. These ions, having high energies, are caused to strike a target including either deuterium or tritium or a combination of deuterium and tritium. This bombardment results in the release of neutrons from the target. In the basic deuterium-deuterium reaction, neutrons having energies in the order of 2 million electron volts are released while in the basic deuterium-tritium reaction, neutrons in the order of 14 million electron volts are released.

Among the presently available methods and apparatus for producing ions are those in which an electric arc discharge gap is provided in an atmosphere of heavy hydrogen wherein an electric arc discharge across the gap ionizes the hydrogen gas to produce ions. Another method consists of placing a titanium or tantalum ribbon between two electrodes and activating this ribbon with deuterium or tritium. When a high voltage is applied across the electrodes, the combination of heat and electric discharge along the ribbon results in the production of ions. A modification of this method provides a continuous coating on a dielectric member which is connected between high voltage electrodes.

With these devices, the instant at which ions will be produced is uncertain as is the instant at which ions are no longer present. In these devices, a reliable pulse timing of less than $2/10$ of a microsecond has been difficult to obtain, whereas the apparatus of this invention, which is hereinafter described by way of example, is capable of producing timed pulses of hydrogen ions, the timing of which may be reliably controlled within time limits in the order of $2/100$ of a microsecond.

It is, therefore, an object of this invention to provide an improved atomic particle source.

A further object of this invention is to provide an improved ion source having a long life.

Another object of this invention is to provide a highly reliable method and apparatus for the production of timed pulses of ions.

It is also an object of this invention to provide an improved highly reliable ion producing method and apparatus for use in apparatus to produce timed pulses of neutrons.

A particular embodiment of this invention provides a plurality of metal electrodes oriented on a dielectric member to provide at least one electric arc discharge gap. The electrodes include a hydrogen composition of the electrode metal so that hydrogen ions are produced when an electric arc discharge occurs across the discharge gap. The ions can be accelerated to strike a target and produce neutrons.

Other objects and applications of this invention will become readily apparent in the following description and claims. In order to obtain a better understanding of this invention, attention is directed to the figures of the drawing in which FIGURE 1 illustrates a preferred embodiment of this invention; FIGURE 2 illustrates a modification of the ion source illustrated in FIGURE 1, and FIGURE 3 illustrates a complete circuit incorporating this invention for the production of short pulses of neutrons.

FIGURE 1 illustrates an example of a structure for the production of neutrons. This structure consists of a metal cap member 10, an activated titanium target 11 and an ion source 12. Ion source 12 is mounted on upright support members 13 and 14 by means of metal caps 15 and 16. Support members 13 and 14 also provide a conductive connection to respective electrodes 17 and 18 which are formed on hollow tubular dielectric support member 19. A spiral heater 20 conductively connected to support members 13 and 14 is utilized to activate the ion source. Support member 13 is mounted through cylindrical base member 21 by means of glass bead 22 which provides a hermetic insulating mounting between support member 13 and base 21. Support member 14 is conductively and mechanically connected to base member 21. Cap 10 and target 11 are mounted in proximity to the ion source 12 by means of cylindrical glass enclosure 23 which is bonded to cap member 10 and annular ring 24. Annular ring 24 is hermetically bonded to base member 21. A glass tubulation 25 is hermetically sealed to base member 21 to provide a means for introducing activating gases and, when the neutron source is in operation, a means for attaching a vacuum maintaining device. A shield 26 partially surrounds the ion source 12 and is conductively attached to base 21.

A number of metals may be used to form a satisfactory target. The basic requirement is that the target readily absorb and form compositions of hydrogen, such as the hydrogen isotopes, tritium and deuterium. This property is known to exist for a number of elements. Among those which absorb the most are lithium, palladium, tantalum, zirconium, and titanium. Tantalum is used as a target material; however, after activation, it is brittle and, therefore, physically difficult to mount in a tube structure. Zirconium is used and can be easily mounted prior to or subsequent to activation. Titanium is desirable because it has a lower atomic number and characteristics otherwise similar to those of zirconium. For this reason, a preferred embodiment of this invention utilizes a titanium target.

A number of methods are known for preparing and using tritium and deuterium activated targets, some of which are described in a publication by E. R. Graves et al., entitled, Preparation and Use of Tritium and Deuterium Targets in "The Review of Scientific Instruments," vol. 20, 1949, pages 579 through 582, inclusive.

The target utilized in the apparatus of FIGURE 1 is prepared by forming a cylindrical disc of titanium of the size of the target which fits inside of cap member 10 which, for example, is formed from an iron-nickel alloy spinning. The titanium target member 11 is formed by rolling a 2 mil sheet of titanium onto a sheet of iron approximately 50 to 60 mils thick. The combined titanium-iron sheet is then processed by a high pressure rolling press which reduces the thickness of the combined sheet by a factor in the order of ten or more and effectively bonds the titanium to the iron. The combined sheet is then spot welded to cap member 10 with the titanium side exposed.

The ion source consists essentially of a plurality of electrodes forming at least one electric arc discharge gap. The electrodes include a hydrogen isotope composition of the electrode metal so that hydrogen ions are produced when an electric arc discharge occurs across the electric arc discharge gap. In the preferred embodiment of the ion source of this invention, the dielectric member 19 consists of an alumina cylinder. The alumina cylinder consists, for example, of a member having the general chemical composition of $Al_2O_3 \cdot SiO_2 \cdot MgO$. Alumina is selected since a comparison of the free energy of various refractory oxides shows that alumina or magnesia are the most stable and suitable oxides to support a thin layer of titanium metal at temperatures in the order of 500° C. and above.

A thin layer of titanium in the order of 1 mil thick is formed on the alumina cylinder in any satisfactory manner. For example, the alumina cylinder is placed in an evacuated container along with a spiral of tantalum wire having a titanium coating thereon. The vacuum is maintained at a pressure in the order of $10^{-5}$ to $10^{-6}$ millimeters of mercury. The alumina cylinder is heated to a dull red heat and the tantalum wire is heated to the point at which the titanium is evaporated from the wire and is deposited on the alumina cylinder. Another method consists of placing the alumina cylinder in an evacuated container along with a molybdenum container of titanium metal. The titanium metal is heated and evaporated onto the heated alumina cylinder.

The alumina cylinder is then removed from the evacuated chamber and a centrally located groove 27 is formed by scraping away the titanium coating. This groove provides a gap of approximately .005 inch across which an electric arc discharge may be initiated and effectively forms the coating on the alumina cylinder into two electrodes.

A spiral Nichrome wire heater 20 is then placed in the bore of the alumina cylinder and the leads thereof brought out and electrically connected to respective support members 13 and 14. Tubular connectors 15 and 16 of material, such as tubular nickel, are press-fitted over the outside of the alumina cylinder to provide electrical contact with electrodes 17 and 18.

The neutron source is assembled by press fitting nickel cylinders 15 and 16 to support members 13 and 14. The support members 13 and 14 which are formed of conductive material such as an iron-nickel alloy are suitably mounted to metal base 21 which consists, for example, of a cylindrical spinning of metal, such as iron-nickel alloy. Support member 14 makes mechanical and electrical contact to base member 21 and is brazed, welded or otherwise connected thereto. Support member 13 is hermetically sealed to insulating glass bead 22 and glass bead 22 is hermetically sealed to base member 21. Cap member 10 and target 11 are then bonded to vitreous cylindrical member 23 of material, such as glass, the bottom portion of which is bonded to annular ring 24 which consists, for example, of iron-nickel-cobalt alloy spinning. These glass-to-metal bonds are formed by any satisfactory method of hermetically bonding metal to vitreous material.

Annular ring 24 is electrically and mechanically bonded to base 21 by any satisfactory means, such as welding or brazing. It is generally important to provide a shielding member so that an ion cloud can be maintained for a prolonged period in the region of source 12. Therefore, open-ended cylindrical member 26 of material, such as stainless steel, is provided. Cylindrical member 26 is mechanically and electrically connected to base 21 in any satisfactory manner, such as by spot welding.

Ion source 12 and target 11 are activated by any suitable method and, by way of example in this embodiment of the invention, activation is accomplished in the following manner. A direct current source (not shown) is connected across heater 20 by making connection to support member 13 and base 21 so that direct current flows through support 13, heater 20, support 14 and base 21. The coated alumina cylinder is heated to a temperature ranging up to a dull red, i.e., a temperature in the order of 400° C. to 750° C., while at the same time, an exhausting system (not shown) is coupled to exhaust tubulation 25 and a vacuum in the order of $10^{-5}$ to $10^{-6}$ millimeters of mercury is maintained. A number of cycles of heating and cooling are provided to assure complete degassing of the titanium coating; however, this is not always necessary since the titanium coating on the target may also be formed by evaporation of titanium in a vacuum. A hydrogen isotope gas is introduced into the tube structure while the alumina cylinder is maintained at a dull red heat and the target is maintained at a temperature in the order of 400° C. to 750° C. The gas is introduced through the exhaust tubulation 25 or alternatively is introduced by placing a compound containing a hydrogen isotope within the tube prior to assembly and causing this compound to release the hydrogen isotope gas. The former method permits greater control of the gas concentration within the tube structure and is generally more desirable.

The hydrogen isotope gas which consists of deuterium or tritium or a combination thereof combines with the titanium coating to form a hydrogen isotope composition including titanium hydride. The activation process occurs almost immediately upon the introduction of the hydrogen isotope gas. The hydrogen isotope gas is then removed by pumping through exhaust tubulation 25 and the enclosure is evacuated to a pressure in the order of $2-3 \times 10^{-6}$ millimeters of mercury.

It is noted that at these temperatures, little or none of the hydrogen isotope gas reacts with and combines with the other metals within the tube structure since they are not heated and are not as active as the titanium target and the titanium coating on the alumina cylinder. The description of ion source 12 and target 11 has been limited to the use of a titanium coating, merely by way of example, and it is within the scope of this invention that one or more metals from the group including titanium, lithium, zirconium and tantalum, be used in a similar manner.

Ion source electrodes may be formed in other manners, such as by plating or bonding foil to a dielectric member. It is essential that the metal or metals used have an affinity for a hydrogen isotope gas, such as deuterium or tritium, and that a layer thereof be suitably formed on a dielectric member, such as an alumina ceramic cylinder 19, to provide a plurality of electrodes and at least one electric arc discharge gap. Alternatively, where a deuterium-tritium reaction is desired, the target and the ion source can be activated with deuterium after which either the target or ion source is deactivated and then subsequently reactivated with tritium.

Another embodiment of the ion source is illustrated by way of example in FIGURE 2 of the drawing. FIGURE 2 shows support members 13 and 14 on which is mounted ceramic cylinder 30. A number of patches of metal, such as titanium or zirconium, 31 are formed on a portion of the cylinder. Electrode connectors 32 and 33 are provided to make connection to these metal patches which form a plurality of electric arc discharge gaps 34. Electrical connection is made to these electrodes by leads 35 and 14.

Electrodes 31 are formed by wrapping masking material, such as fine wire, about the alumina cylinder 30 and then evaporating metal, such as titanium or zirconium, on the cylinder in the manner previously described. Alternatively, metal patches 31 are formed by evaporating metal on one side only of ceramic cylinder 30 and scraping portions of the metal coating away so as to form a plurality of electric arc discharge gaps. The ion source shown in FIGURE 2 may be activated in the manner previously described in connection with the ion source 12 of FIGURE 1. Filament 36 heats the ion source in order to effect activation. Connectors 32 and 33 are bonded to the ion source by clamping and spot-welding and to electrical connectors by means of brazing or welding. The ion source shown in FIGURE 2 provides a plurality of electric arc discharge gaps which are desirable in certain applications.

A neutron source, such as that illustrated in FIGURE 1, and utilizing an ion source of a type embodying the elements of this invention, such as that illustrated in FIGURE 1, or that illustrated in FIGURE 2, is operated by applying a high voltage pulse between connector and support member 13 and base 21. This results in an arc discharge across gap 27. The arc heats a portion of the electrode coatings 17 and 18 and results in the release of hydrogen isotope gas. The released hydrogen isotope gas is ionized by the electric arc thereby forming a cloud of ions in the vicinity of gap 27. A short period after the initiation of the ionizing pulse, a voltage pulse is applied between base 21 and target 11 to pulse target 11 negative and accelerate the hydrogen isotope ions to cause them to strike target 11 with high energies. This results in the release of neutrons from the target 11.

At high frequencies, the spiral heater has a relatively high impedance and, therefore, acts essentially as an open circuit so that for high frequency high voltage purposes, the circuit of the ion source consists of electrode and support member 13 conecting cap 15, electrode coating 17, electric arc discharge gap 27, electrode coating 18, connecting cap 16 and support electrode 14. The metal shield 26 is maintained at a positive potential in order to aid in maintaining the ion cloud in the vicinity of gap 27.

Since the action of the ion source 12 results in the release of hydrogen isotope gas, it is generally desirable and necessary to provide a means for maintaining a high degree of vacuum, for example, by coupling a continuously acting ion pump (not shown) to the exhaust tubulation 25. Such a pump may be of the type described in a patent application by A. M. Gurewitsch and W. Westendorp, entitled, Ionic Vacuum Pump Device, Ser. No. 350,964, filed Apr. 25, 1953, and assigned to the same assignee as this invention.

An example of a circuit utilizing a neutron source incorporating the pulsed ion source of this invention is illustrated in FIGURE 3 of the drawing. This circuit consists of trigger signal source 40, spark gap switch 41, in which an arc discharge is initiated by starting electrode 42 and discharge electrode 43. High voltage source 44 provides charging current for discharge capacitor 45 through current control resistor 46. Capacitor 45 is coupled through lead 47 to arc discharge switch 41. The other electrode 48 of electric arc discharge switch 41 is connected through current transformer coil 49 to the ion source terminal 50 of a neutron source 51, such as that illustrated in FIGURE 1 of the drawing. The other side of the hydrogen ion source of neutron source 51 is connected from terminal 52 to ground. The hydrogen ion source is generally illustrated at 53. Transformer 54 has a ferromagnetic core and is coupled through delay line 55, and blocking condenser 56 to starter electrode 57 in arc discharge switch 58. The high voltage source 44 is also coupled through current limiting resistor 59 to discharge electrode 60 of arc discharge switch 58 and to discharge capacitor 61. The other terminal of capacitor 61 is connected to auto-transformer 62, the high potential end of which is connected to neutron target 63. The ion source 53 and neutron target 63 may be incorporated in a single unit, such as that illustrated in FIGURE 1 of the drawing. The second discharge electrode 64 of electric discharge switch 58 is connected to an intermediate point on auto-transformer 62.

The apparatus illustrated in FIGURE 3 operates in the following fashion. High voltage source 44 charges capacitor 45 through current limiting resistor 46 to the potential of high voltage source 44. Capacitor 45 is discharged when a trigger signal applied to starting electrode 42 and discharge electrode 43 initiates an electric arc discharge between electrodes 43 and 48. This discharge current is impressed on ion source 53 and flows through 53 to ground. For example, in the device illustrated in FIGURE 1, this current flows from support conductor 13 through the arc discharge gap 27 to support conductor 14. The arc discharge has a duration in the order of $\frac{1}{10}$ of a microsecond and produces a cloud of ions.

The discharge which produces the ion cloud also produces a pulse through current transformer coil 49. This pulse is sharpened by the presence of ferromagnetic core of transformer 54. This pulse is delayed by delay line 55 for approximately $\frac{1}{10}$ of a microsecond, passes through blocking capacitor 56 to starter electrode 57 and initiates an arc discharge between electrodes 60 and 64 to discharge capacitor 60 which has been charged by high voltage source 44 through current limiting resistor 59. A current is thereby caused to flow through a portion of auto-transformer 62 to pulse target 63 negative and provide a high accelerating voltage between the ion source and target 63 which accelerates the ions to a high energy level. The ions strike the target 63 with high energies and result in the dissociation of the hydrogen isotope contained in the target thereby resulting in a release of neutrons. As has been previously described, by proper selection of voltages and circuit parameters, it is possible to obtain neutrons having energies in the order of 2 million electron volts in a deuterium-deuterium reaction and neutrons having energies in the order of 14 million electron volts in a deuterium-tritium reaction.

In view of the foregoing, it may be seen that there is provided by this invention a pulsed hydrogen ion source for use in a neutron source which is adapted to be pulsed in the order of many thousands of times in succession before the hydrogen isotope gas in the electrodes is exhausted. This source is easily and economically produced and results in a source having a high degree of reliability. Substantially instantaneous and reliable ion pulse formation is assured by the well-defined electric arc discharge gap or gaps which provide a multiplicity of cathode spots which regularize performance. The production of a large number of hydrogen ions is assured by the presence of hydrogen isotopes and hydrogen isotope compositions in and forming a part of the electric arc discharge electrodes. This results in a device susceptible to pulse time control in the order of $\frac{2}{100}$ microsecond.

While particular embodiments of this invention have been described, it will be apparent that changes and modifications may be made without departing from this invention and it is intended in the appended claims to cover all such changes and modifications as fall within the true spirit and scope of this invention.

What I claim as new and desire to secure by Letters Patent of the United States is:

1. An atomic particle source including a source of ions comprising a dielectric member, a plurality of electrodes closely spaced upon said dielectric member to provide at least one electric arc discharge gap producing an arc discharge instantaneously upon the application of a potential difference thereacross, said electrodes including a hydrogen composition to form hydrogen ions when an electric arc discharge occurs across said gap.

2. An atomic particle source including a source of ions comprising a dielectric member, a plurality of metal electrodes closely spaced upon said dielectric member to provide at least one electric arc discharge gap producing an arc discharge instantaneously upon the application of a potential difference thereacross, said electrodes including at least one hydrogen isotope composition to form hydrogen ions when an electric arc discharge occurs across said gap.

3. In a neutron source a source of ions comprising a dielectric member, a plurality of electrodes including at least one metal from the group consisting of lithium, titanium, and zirconium, said electrodes being closely spaced upon said dielectric member to provide at least one electric arc discharge gap producing an arc discharge instantaneously upon the application of a potential difference thereacross, said electrodes including at least one hydrogen isotope composition to form hydrogen ions when an electric arc discharge occurs across said gap.

4. An apparatus as defined in claim 3 in which the hydrogen isotope is deuterium.

5. An apparatus as defined by claim 3 in which the hydrogen isotope is tritium.

6. A source of ions comprising a dielectric member, a discontinuous metal coating on said dielectric member, said coating providing a plurality of electrodes and at least one electric discharge gap, said metal coating including a hydrogen composition to form hydrogen ions when an electric arc discharge occurs across said gap.

7. A source of ions comprising a dielectric member, a discontinuous metal coating on said dielectric member including at least one metal from the group consisting of lithium, titanium, and zirconium, said coating providing a plurality of electrodes and at least one electric discharge gap, said metal coating including at least one hydrogen isotope composition to form hydrogen ions when an electric arc discharge occurs across said gap.

8. A source of ions comprising an elongated dielectric member, a continuous metal coating on the ends of said member to provide a centrally oriented electric discharge gap, said metal coating including at least one hydrogen composition of the metal of said coating to form hydrogen ions when an electric arc discharge occurs across said gap.

9. A source of ions comprising an elongated dielectric member, a continuous metal coating on the ends of said member to provide a centrally oriented electric discharge gap, said metal coating including at least one hydrogen isotope composition of the metal of said coating to form hydrogen ions when an electric arc discharge occurs across said gap.

10. A source of ions of the type defined by claim 9 wherein the metal coating includes at least one metal from the group consisting of lithium, titanium, and zirconium.

11. In an atomic particle source a source of ions comprising a dielectric member, a plurality of electrodes closely spaced upon said dielectric member to provide at least one electric arc discharge gap producing an arc discharge instantaneously upon the application of a potential difference thereacross, a target insulated from said electrode and oriented in proximity to said gap, said electrodes including at least one hydrogen composition of said electrodes to form hydrogen ions when an electric arc discharge occurs across said gap to produce neutrons when said ions are accelerated to bombard said target by a potential applied between said target and said electrodes.

12. In a neutron source a source of ions comprising a dielectric member, a plurality of metal electrodes including at least one metal from the group consisting of lithium, titanium and zirconium, said electrodes being closely spaced upon said dielectric member to provide at least one electric arc discharge gap producing an arc discharge instantaneously upon the application of a potential difference thereacross, a metal target including at least one metal from the group consisting of lithium, titanium, and zirconium oriented in proximity to said gap, said electrodes including at least one hydrogen composition of said electrode metal and said target including at least one hydrogen composition of said target metal to produce hydrogen ions when an electric arc discharge occurs across said gap, which ions may be accelerated by a potential applied between said target and said electrodes to bombard said target to produce neutrons.

13. In a neutron source, a source of ions comprising a dielectric member, a plurality of metal electrodes including at least one metal from the group consisting of lithium, titanium, and zirconium, said electrodes being closely spaced upon said dielectric member to provide at least one electric arc discharge gap producing an arc discharge instantaneously upon the application of a potential difference thereacross, a metal target insulated from said electrodes and including at least one metal from the group consisting of lithium, titanium, and zirconium and oriented in proximity to said gap, said electrodes including a hydrogen isotope composition to form hydrogen ions when an electric arc discharge occurs across said gap to produce neutrons when said ions are accelerated to bombard said target by a potential applied between said target and said electrodes.

14. In an atomic particle source a source of ions comprising a dielectric member, a plurality of electrodes closely spaced upon said dielectric member to provide at least one electric arc discharge gap producing an arc discharge instantaneously upon the application of a potential difference thereacross, a target insulated from said electrodes and oriented in proximity to said gap, said electrodes including a hydrogen isotope composition to form hydrogen ions when an electric arc discharge occurs across said gap and said target including a hydrogen isotope composition to produce neutrons when said ions are accelerated to bombard the target by a potential applied between said target and said electrodes.

15. A neutron source comprising a dielectric member, a discontinuous metal coating on said member including at least one metal from the group consisting of lithium, titanium, and zirconium, said coating providing a plurality of closely-spaced electrodes and at least one electric discharge gap to form ions when an electric discharge occurs across said gap, a target insulated from said electrodes and including at least one metal from the group consisting of lithium, titanium, and zirconium and located in proximity to said gap, said coating and target including at least one hydrogen isotope composition of the coating and target metals whereby neutrons are produced when the ions are accelerated to bombard said target.

16. A neutron source comprising a dielectric member, a plurality of electrodes closely spaced upon said dielectric member to provide at least one electric arc discharge gap producing an arc discharge instantaneously upon the application of a potential difference thereacross, a first high voltage source adapted to be coupled across said gap, a target insulated from said electrodes and oriented in proximity to said gap, said target and said electrodes including a hydrogen istope composition, and a second source of high voltage coupled to said target to accelerate hydrogen ions, released when said first high voltage source is connected across said electrodes to bombard said target and produce neutrons.

17. A neutron source of the type defined in claim 16 wherein said electrodes and said target include at least one hydrogen isotope composition of at least one metal from the group consisting of lithium, titanium, and zirconium.

18. The method of producing a hydrogen isotope ionic particle source which method comprises forming a discontinuous metal coating on a dielectric member, activating the metal coating with a hydrogen isotope to form at least one hydrogen isotope composition of the metal coating.

19. The method of producing pulses of ions which method comprises forming a discontinuous metal coating on a dielectric member, activating the metal coating with a hydrogen isotope to form a hydrogen isotope composition of said coating metal, coupling a pulsed high voltage source across the gaps formed by said discontinuous activated metal coating to form ions.

20. A neutron source which includes a dielectric member, arc discharge electrodes closely spaced upon said dielectric member to define at least one arc discharge gap therebetween producing an arc discharge instantaneously upon the application of a potential difference thereacross and comprising at least one hydrogen composition of a metal to produce hydrogen ions when an arc discharge occurs across an arc discharge gap in response to a first potential impressed between said electrodes, and a target insulated from and oriented in proximity to an arc discharge gap and comprising at least one hydrogen composition of a metal to produce neutrons when said ions are accelerated to bombard said target by a second potential impressed between said electrodes and said target.

21. The method of producing neutrons utilizing apparatus including a discontinuous metal coating on a dielectric support providing a plurality of arc discharge electrodes and at least one arc discharge gap and a metallic target electrode in close proximity to said discharge gap which method comprises, activating said metal coatings with a hydrogen isotope to form at least one hydrogen isotope composition of said metal coatings, causing an arc discharge across a discharge gap by applying a first potential across said electrodes to form hydrogen ions, and accelerating said ions to bombard said target to produce neutrons by applying a second potential between said target and said electrode.

References Cited
UNITED STATES PATENTS

| | | | |
|---|---|---|---|
| 2,211,668 | 8/1940 | Penning | 313—61 |
| 2,489,436 | 11/1949 | Salisbury | 313—61 |
| 2,600,151 | 6/1952 | Backus | 250—41.9 |
| 2,724,056 | 11/1955 | Slepian | 250—41.9 |

JAMES W. LAWRENCE, *Primary Examiner.*

R. L. CAMPBELL, M. EVANS, *Examiners.*

J. H. LINSCOTT, R. A. VAN KIRK, *Assistant Examiners.*